June 19, 1956  A. W. PETERS  2,751,200
LIQUID HEATER
Filed Oct. 11, 1951

INVENTOR
A.W. Peters
BY
Charles S. Haughey
AGT.

United States Patent Office 2,751,200
Patented June 19, 1956

2,751,200
LIQUID HEATER

Arthur W. Peters, Toledo, Ohio, assignor to Surface Combustion Corporation, Toledo, Ohio, a corporation of Ohio Application October 11, 1951, Serial No. 250,862

2 Claims. (Cl. 257—241)

The present invention relates to a fuel burning heater for heating a heat transfer liquid and has for its general object to provide an improved heater for that purpose. More particularly, the invention provides a heater which is particularly well adapted for the rapid heating of liquids which are subject to thermal decomposition or volatilization in a closed circuit which includes the heater.

In this invention the heater comprises an annular chamber wherein the liquid is heated as it flows therethrough. The heating of volatile liquids or liquids which are chemically unstable at high temperatures, to temperatures just below the safe high temperature limit thereof requires great care in maintaining uniform temperatures throughout the liquid heater and positive control of flow of the liquid through the heater. To provide these desirable characteristics certain features of the design are specially provided as will be hereinafter explained in some detail.

For a consideration of what I believe to be novel and my invention, attention is directed to the following specification and the drawing and concluding claims thereof.

In the accompanying drawing forming a part of this specification—

Figure 1:
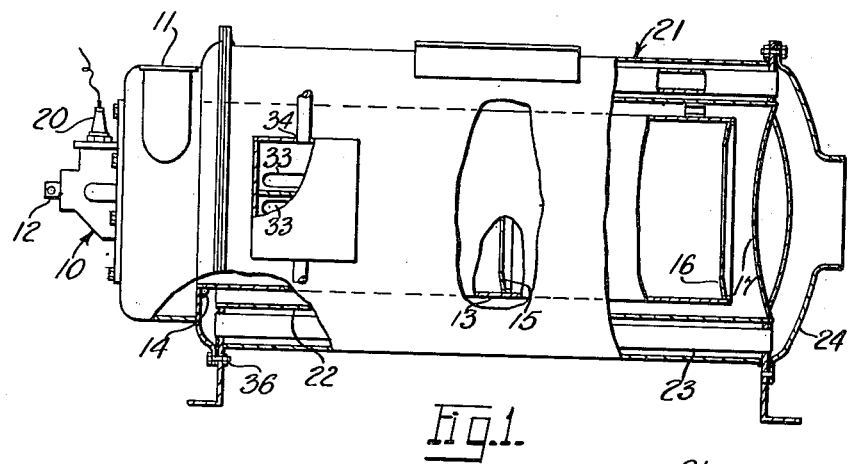
Fig. 1 is an axial, partially sectional view of the improved heater.
Figure 2:
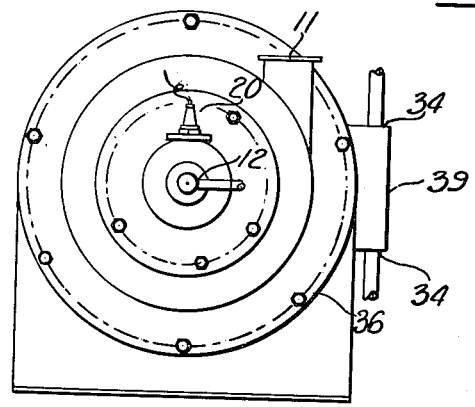
Fig. 2 is an end view of the heater showing the burner end thereof.
Figure 3:
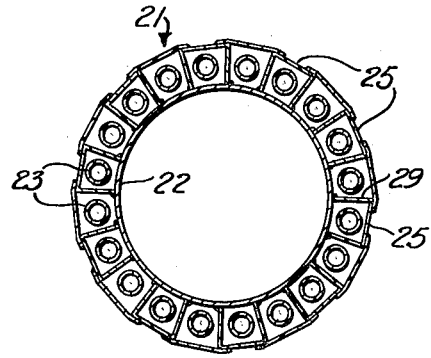
Fig. 3 is a transverse cross-sectional view of the heat exchanger.
Figures 4, 5:
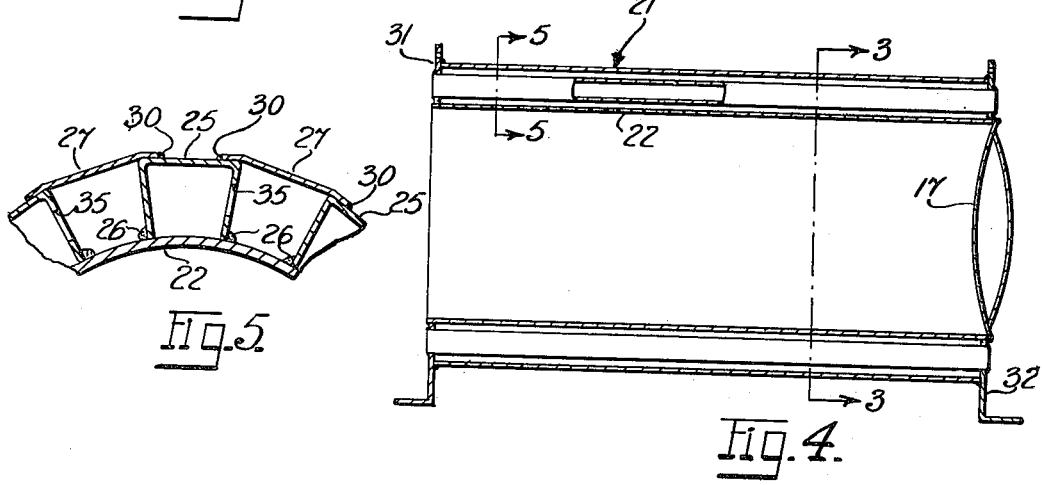
Fig. 4 is a longitudinal cross-sectional view of the heat exchanger.
Fig. 5 shows a detail of construction of the heat exchanger.

The heater comprises a burner generally indicated at 10 having a tangential air supply inlet 11, a central fuel inlet 12 and an ignition spark plug 20. The burner fires a whirling flame down the dry shield 13 which is made integral with the burner by welding at 14. Orifices 15 and 16 are provided to improve combustion. Combustion gases pass through the dry shield to the end wall 17 of a combustion chamber formed by the inner wall 22 of a heat exchanger which is generally indicated at 21, then pass through the annular space between the inner wall 22 and the dry shield 13 to enter flue tubes 23 which extend through heat exchanger, thence pass through the exhaust gas manifold 24. To avoid overheating of the exhaust manifold by radiation of heat through the end wall 17, that end wall is made of oppositely dished plates secured at their peripheries by welding to form a resilient end wall which materially reduces heat radiation to the exhaust manifold, thus increasing the heat transferred to the liquid passing through the heat exchanger.

The heat exchanger 21 comprises the inner shell 22, a series of U-shaped channel members 25 welded thereto by welds 26 around its periphery and parallel to its axis, a series of cover plates 27 extending between the channel members 25 and welded thereto by welds 30 to form with and between said members a continuous peripheral series of channels through which a liquid to be heated may be consecutively passed. The sides of the channel members in the heat exchanger are substantially uniformly spaced around the periphery of the shell, for reasons which will appear. End walls 31 and 32 are provided to seal the ends of the channels formed by and between the members 25, the plates 27 and the inner wall 22 of the heat exchanger. A radial wall of one of the channel members 25 extends continuously from end wall 31 to 32, and the plate 27 and the outer wall of the channel 25 next adjacent said radial wall are provided with ingress and egress orifices 33 for liquid to be heated. The orifices 33 are of slot form, and an adapter box 39 is welded thereover to provide ordinary threaded pipe connections 34 for the inlet and outlet of said liquid. Except for the one radial wall 29 which continuously extends between the end walls 31 and 32, all radial walls of the annular liquid chamber formed by said channel members are provided with apertures at alternate ends whereby liquid entering the ingress orifice 33 must flow consecutively through the channels of said series to reach the egress orifice 33 on the other side of the dividing wall 29. The flue tubes extend axially and centrally through said channels between said end walls 31 and 32, thus dividing the liquid flow space in each channel into an annular flow space of substantially uniform thickness and proximity to said tube.

The heat exchanger is assembled by first securing channel shaped members 25 to the inner shell 22 by tack welding them at intervals along their radial walls, the walls being previously formed to have a suitable angle with respect to each other towards that end. The angle formed by lines extended from the sides of the channels 25 and intersecting at the center of the shell 22 in the assembled heat exchanger will be defined by the formula $$A = \frac{360}{2N}$$

where A is the angle and N is the number of channel member 25 required in the assembly. A continuous weld bead 26 is then laid along each leg of the member 25 to form a heat conducting and liquid tight seal, and a rigid structure which retains its shape during the laying of said weld bead due to said tack welding. End walls 31 and 32 are next welded in place to form similarly heat conducting and liquid tight joints with the wall 22 and the channel shaped members 25, then the cover plates 27 are welded to said members by welds 30, and are also welded to said end walls. Flue tubes 23 are then placed one in each channel and supported in holes in the end walls 31 and 32 provided therefor whereby to support the tubes axially and centrally in the channels. The tubes 23 are then welded in place as were the members 25 and the plates 27, completing the formation of the liquid chamber of the heat exchanger 21. An end wall 17, formed of two dished plates secured together at their periphery, is then welded in place at one end of the inner wall 22 to complete the assembly of the heat exchanger. The liquid heater is then formed by inserting the dry shield 23 of the burner assembly into the combustion chamber formed by the inner wall 22 and the end wall 17, and the burner is secured in place to end wall 31 by bolts 36.

The herein disclosed construction of a heat exchanger provides positive flow control of the liquid to be heated and avoids short circuiting of flow of liquid between ingress and egress orifices 33 with consequent uneven heating of the liquid and risk of overheating portions thereof.

This invention may be considered to be an improvement over the structure shown in my co-pending application Serial No. 74,839, filed February 5, 1949, now Patent 2,617,393 issued November 11, 1952.

Having disclosed my invention, I claim:

1. A heat exchanger for gas to liquid heat transfer, which comprises: a cylindrical shell; a series of spaced, inverted U-shaped channel members secured thereto by welds in axially parallel relation to form substantially equal spacing under the channel members and between them; a pair of end walls at the respective ends of the members of said series and secured thereto by welds; a series of cover plates each spanning the space between two adjacent members and welded thereto and to said end walls; the walls of the channel members being provided with orifices at alternate ends of said walls except for one wall which is imperforate, and liquid ingress and egress orifices being provided in the heat exchanger next adjacent to and on opposite sides of said imperforate wall whereby to form a circular series of liquid passages from end to end of the heat exchanger; and a series of gas conduit tubes passing through each space under and between the channels and secured to said end walls in holes therein provided.

2. A heat exchanger for gas to liquid heat transfer, which comprises: a cylindrical shell; a series of spaced, inverted U-shaped channel members secured thereto by welds in axially parallel relation to form substantially equal spacing under the channel members and between them; a pair of end walls at the respective ends of the members of said series and secured thereto by welds; a series of cover plates each spanning the space between two adjacent members and welded thereto and to said end walls; and a series of gas conduit tubes passing through each space under and between the channels and secured to said end walls in holes therein provided.

References Cited in the file of this patent

UNITED STATES PATENTS

| | | |
|---|---|---|
| 1,029,908 | Benjamins | June 18, 1912 |
| 1,382,495 | Fowles | June 21, 1921 |
| 1,737,732 | Sauvage | Dec. 3, 1929 |
| 1,942,211 | Hartwig | Jan. 2, 1934 |
| 2,105,801 | Watts | Jan. 18, 1938 |
| 2,123,444 | Thibaudeau | July 12, 1938 |
| 2,428,066 | Ellis | Sept. 30, 1947 |
| 2,531,459 | Marshall | Nov. 28, 1950 |
| 2,617,393 | Peters | Nov. 11, 1952 |

FOREIGN PATENTS

| | | |
|---|---|---|
| 419,728 | Italy | Apr. 2, 1947 |